Sept. 11, 1928.

G. E. HOLTON 1,684,321

PISTON AND CONNECTING ROD TESTING AND ALIGNING MACHINE

Filed June 14, 1926      4 Sheets-Sheet 1

INVENTOR
George E. Holton
BY
Parker & Burton
ATTORNEY

Sept. 11, 1928.

G. E. HOLTON 1,684,321

PISTON AND CONNECTING ROD TESTING AND ALIGNING MACHINE

Filed June 14, 1926   4 Sheets-Sheet 2

INVENTOR
George E. Holton
BY
Parker & Burton
ATTORNEY

Sept. 11, 1928.  
G. E. HOLTON  
1,684,321  
PISTON AND CONNECTING ROD TESTING AND ALIGNING MACHINE  
Filed June 14, 1926  4 Sheets-Sheet 3

INVENTOR  
George E. Holton  
BY  
Parker & Burton  
ATTORNEY

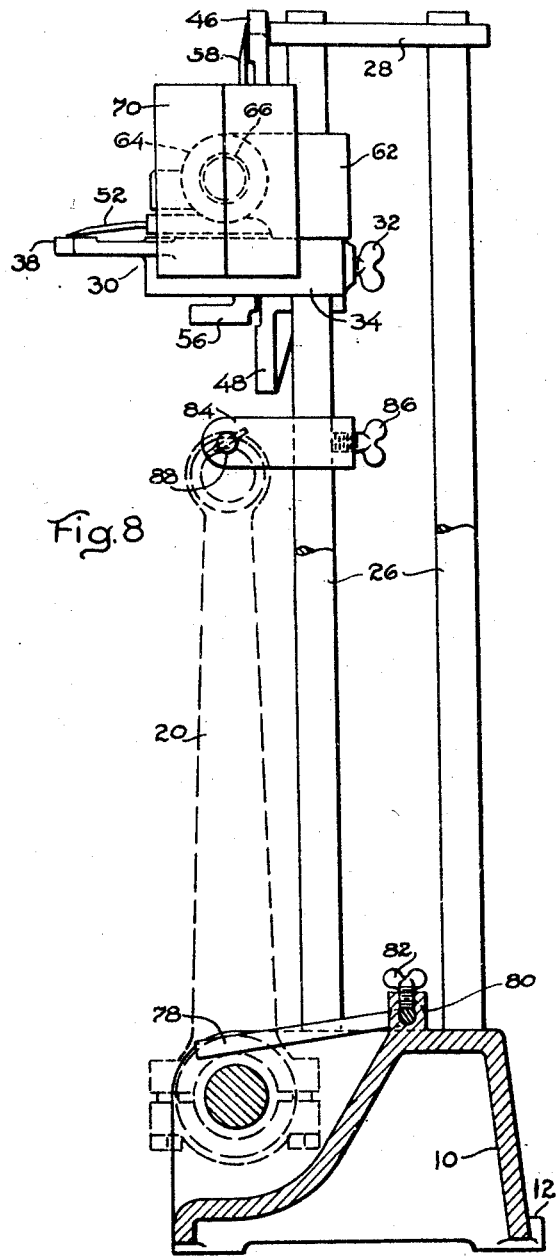

Patented Sept. 11, 1928.

1,684,321

UNITED STATES PATENT OFFICE.

GEORGE E. HOLTON, OF JACKSON, MICHIGAN, ASSIGNOR TO HINCKLEY-MYERS COMPANY, OF JACKSON, MICHIGAN, A CORPORATION OF MICHIGAN.

PISTON AND CONNECTING ROD TESTING AND ALIGNING MACHINE.

Application filed June 14, 1926. Serial No. 115,854.

My invention relates to an improved piston and connecting rod testing and aligning machine through the employment of which it is possible to easily and quickly test and align the accuracy of a connecting rod, its bearings and the piston pin mounted thereon.

My improved machine is so constructed that the deviation of the rod from true accuracy and alignment will be indicated instantly and automatically. My machine is adapted to removably receive connecting rods of different length, size and diameter of bearings. It is adapted to indicate readily and quickly whether the bearings are in alignment and what and where is the variation from true accuracy. It indicates such variation upon a dial, the character, location and extent thereof, and upon correction the extent of the correction and whether complete or partial.

The connecting rod is adapted to be received by the machine, tested, and if the test shows misalignment or inaccuracy, to be dropped to the working position without being removed from the machine where it may be trued up and successive tests then taken to indicate the extent of the truing operation.

A meritorious feature of my improved machine lies in the provision of an arbor adapted to receive the crankshaft bearing of a connecting rod, in combination with a plurality of individually operable indicating devices, adjustable as a unit toward or away from said arbor to be properly positioned to engage the piston end of the connecting rod, which indicating devices are each angularly adjustable with respect to the axis of the arbor and each is provided with means automatically operable to register the extent of such angular adjustment. Each indicating device is adapted to engage a part of the crankshaft to indicate the alignment of the axis of the piston pin bearing of the rod with the axis of the crankshaft bearing of the rod. An added advantage consists in the provision of such a machine wherein one indicating device engages the piston pin carried by the rod at opposite sides of its bearing support in the rod, and a second indicating device engages the piston pin at an angle with respect to the part thereof engaged by the first indicating device.

Other important advantages of my improved machine will more fully appear from the following description, appended claims and accompanying drawings, in which:

Fig. 8 is an end elevation partly in section of my machine.

Figure 1:
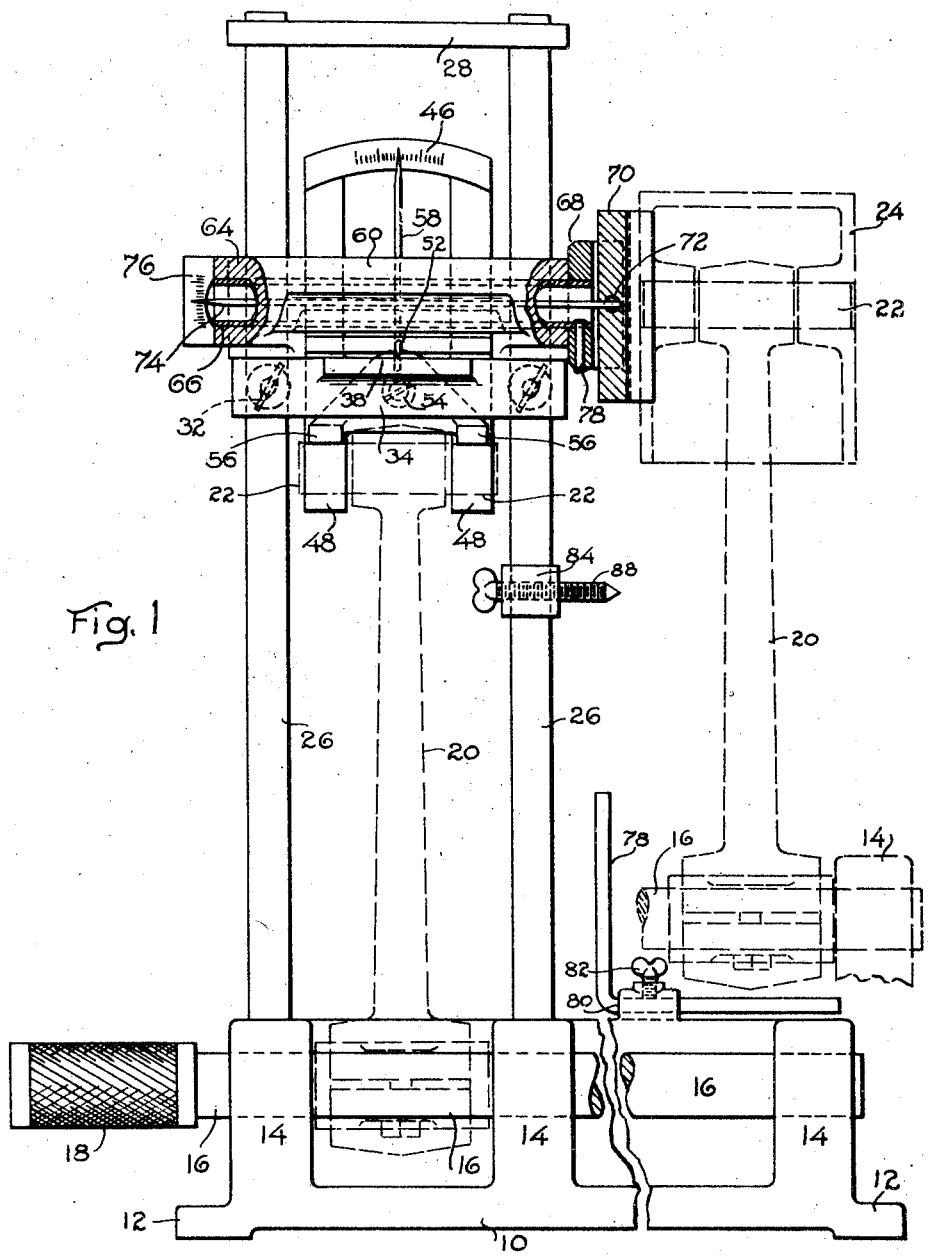
Figure 1 is a front elevation.
Figure 7:
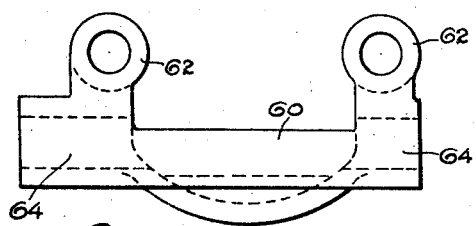
Fig. 7 is a plan of the head cap.
Figure 6:
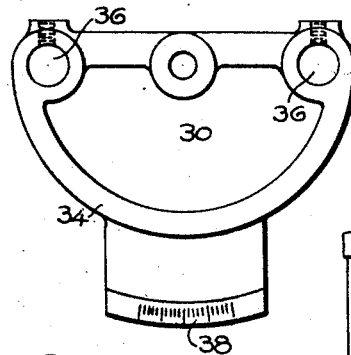
Fig. 6 is a plan of a portion of the head.
Figure 4:
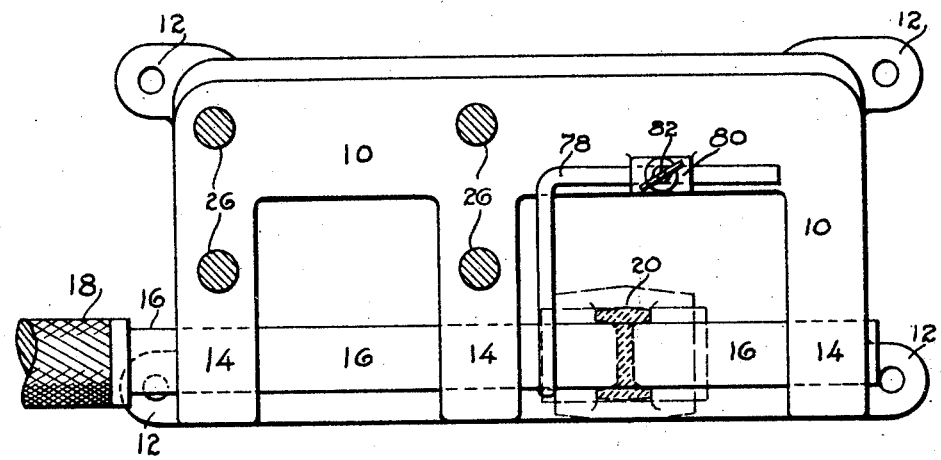
Fig. 4 is a horizontal sectional view taken on line 4—4, Fig. 1.

My machine is provided with a base 10 which is adapted to be suitably positioned upon a work bench or wherever it is desired. I have shown perforated lugs 12 through which fastening connections may be passed to secure the same rigidly in place. The base is shown in plan Fig. 4 and is provided with three spaced apart upright bearings 14 adapted to removably receive an arbor 16 which has one end 18 formed to provide a hand grip portion. This arbor is adapted to receive the bearing at one end of the connecting rod which is indicated in dotted line and in assembly as 20. The crankshaft bearing is here shown as mounted upon the arbor and suitable bushings of different size may be furnished to mount bearings of different diameter upon the arbor. The opposite end of the connecting rod carries a piston pin also shown in dotted outline as 22, and in certain of the views the connecting rod 20 provided with the piston pin 22 is fitted with a piston 24 (Fig. 1).

The base is provided with upright guides or standards 26, four being here shown, and having a plate 28 at the top to hold them in place. A slidable head is mounted upon two of these guide standards 26. This head is indicated in assembly as 30. It is slidable on the standards to be moved toward and away from the arbor 16 and supported in adjusted positions with respect thereto through the employment of thumb screws 32. The head is adjustable as is stated to accommodate connecting rods of different length.

This head carries indicating devices which contact the free end of the connecting rod at determined places to indicate the accuracy of alignment thereof.

Figure 5:
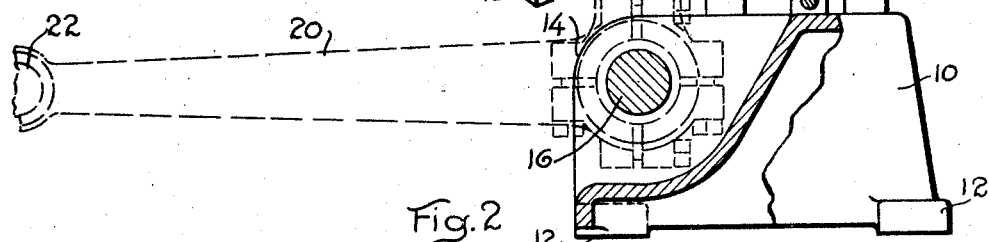
Fig. 5 is a perspective of one of the indicating devices.
Figure 2:
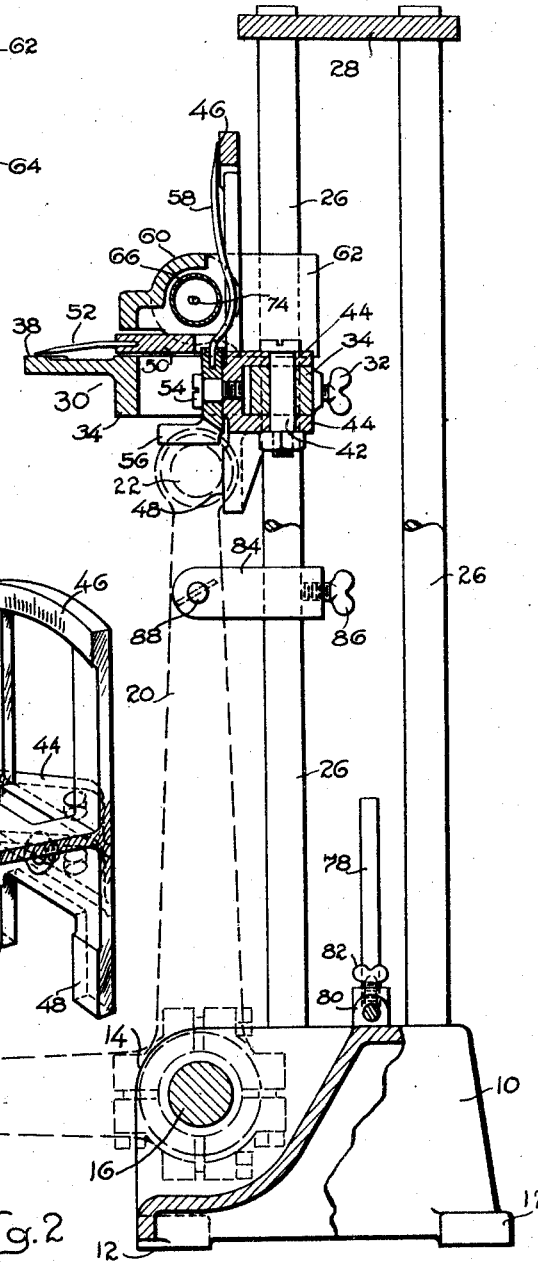
Fig. 2 is a vertical sectional view taken on line 2—2, Fig. 1.

The head has a body portion 34 provided with guide apertures 36 adapted to be received over the guides 26 to support the head thereon for slidable movement. A dial plate 38 is also provided upon the body. This body carries thumb screws 32. An indicating device denoted as a unit by the numeral 40 (Fig. 5) is pivotally supported for movement in a horizontal plane upon this head by a pivot pin 42. This indicating device has a pair of wings 44 which are perforated to be mounted upon the pin 42, as shown in Fig. 2, and when so mounted is adapted to swing in a horizontal plane. It has an upright portion 46 which forms a dial. It has two spaced apart downwardly extending parts 48 which are adapted to contact opposite ends of the piston pin 22 carried by the connecting rod. It has a forwardly extending shelf 50 which carries a pointer 52 that registers upon the dial 38 of the body, the angular adjustment of the indicating device necessary to bring it into contact with both ends of the piston pin 22.

Figure 3:
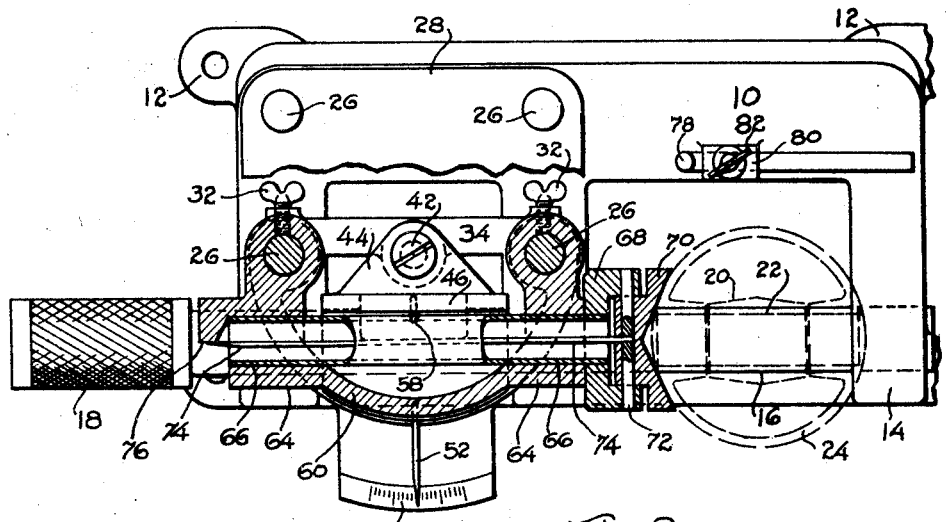
Fig. 3 is a horizontal sectional view taken on line 3—3, Fig. 1.

The indicating device 40 is so mounted that when the portions 48 are parallel to the vertical axial plane of the arbor 16 the pointer 52 will indicate such fact upon the center line of the dial 38, as shown in Fig. 3.

A second indicating device is provided which is pivotally mounted upon the first indicating device by a pivot pin 54 (Figs. 1 and 2). The second indicating device has spaced apart portions 56 adapted to bear at opposite ends of the piston pin on both sides of its bearing in the connecting rod at an angle to the bearing thereagainst of the parts 48 of the device 40. This indicating device carries a pointer 58 which extends upwardly to travel across the dial 46 to indicate any vertical deviation of the two ends of the piston pin from true alignment with the bearing which is mounted upon the arbor 16. It will be seen that the pointer 58 would indicate any bend in the connecting rod which would produce a deviation from true accuracy, and the pointer 52 would indicate any twist in the connecting rod which would produce deviation from the true accuracy.

A cap 60 is provided with seats over the body 34 and has portions 62 which fit freely over the guide standards 26. This cap has a transverse bearing 64 (Fig. 3) through which extends a tubular shaft 66, which shaft carries at one end an end piece 68 within which is pivotally mounted a face plate 70, which face plate is supported within the cap upon a pivot pin 72, upon which pivot pin is also mounted a pointer 74 the free end of which travels over a dial 76.

The tubular shaft is rotatably supported within its bearing in the cap 60, and the end piece 68 is secured to the tubular shaft by a pin 78 to rotate therewith. The face plate 70 pivoted upon the pin 72 within the end piece 68 has an angular adjustable movement relative to such tubular shaft irrespective of the position to which the shaft may have been rotated, and this angular adjustable movement is indicated by the pointer 74 traveling over the dial 76.

The face plate 70 is grooved as shown in Figs. 1 and 3 so as to engage the periphery of the piston 24. The structure described in this paragraph and the two preceding paragraphs forms the basis of a specific divisional application Ser. No. 176,840, filed March 21, 1927, and is here retained only because of its place in the general combination.

When it is desired to true up the connecting rod, the crankshaft end of the rod is mounted upon the arbor 16 between the two bearings 14 which are in alignment with the head 30; the head is adjusted to the required height and secured in place by the set screws 32; the pin 22 is brought into contact with the portions 48 of the indicating device which is swiveled upon the pivot pin 42 and the portions 56 of the indicating device which is swiveled upon the pivot pin 54.

If the piston pin 22 is accurately aligned with the bearing mounted upon the arbor 16 and there are no bends or twists in the connecting rod, the pointers 52 and 58 will register in the manner shown in Figs. 1 and 3. If there is a twist or bend in the connecting rod the twist will be indicated by the pointer 52 and the bend by the pointer 58, as these pointers will be actuated by the angular adjustment of the indicating devices that carry the pointers which is necessary to bring such indicating devices into engagement with the piston pin 22.

It is not necessary to remove the connecting rod to true up the same but it may be dropped to the lowered position shown in Fig. 2 and trued up and a new reading taken to indicate whether or not such truing operation has been complete. Successive truing operations and readings may be taken until the connecting rod is accurately lined up.

The mounting of the piston upon the connecting rod may be measured by placing the rod upon the arbor between the bearings 14 which are offset from the head as shown in Figs. 1 and 3, bringing the side of the piston against the grooved face plate 70. With the piston held against the V-shaped face plate 70 it can be tilted upon the piston pin to its extreme positions and the pointer 74 will indicate any misalignment thereof.

My machine is provided with gauges which check offset in the connecting rod itself. The connecting rod is placed on the arbor between the bearings 14 last referred to offset the head and gauge member 79 pivotally carried by a bearing 80 and held in adjusted position by a thumb screw 82 is dropped against the end of the crankshaft bearing that is mounted upon the arbor 16. An adjustable gauge 84 is then positioned by means of a set screw 86 at the correct height on the standard 26 to bring the gauge screw 88 into position to be actuated to engage the end of the piston pin bearing at the opposite end of the connecting rod. Leaving these two gauges 88 and 78 in the positions to which they have been adjusted, the connecting rod may now be removed from the arbor and reversed in its position thereon, and it will be seen whether or not opposite ends of the bearings contact the gauges or whether there is an offset in the rod.

It will be noted that my machine is adapted to provide for a wide variety of tests and measurements which will take care of completely testing up the true character and accurate alignment of a connecting rod and piston mounted thereon and these measurements are indicated instantaneously and automatically, and the extent of variation is likewise indicated so that correction thereof can be readily accomplished and the accuracy of such correction readily measured to determine whether or not it is complete.

What I claim is:

1. In a connecting rod testing and aligning machine, a support for the bearing at one end of the rod a pair of indicating devices, means supporting said indicating devices in operative position with respect to said support, said indicating devices adapted to individually contact the wrist pin of a rod mounted upon said support, each indicating device being angularly adjustable upon said supporting means with respect to the axis of said support and with respect to the other device.

2. In a machine for testing and aligning a connecting rod having a bearing at each end and a pin fitted in one of said bearings, a frame, a support on the frame for the bearing at one end of the rod, a plurality of indicating devices, means mounting said indicating devices upon the frame for adjustment as a unit toward and away from said support, each of said devices being individually adjustable angularly on said mounting means with respect to the axis of said support and a registering member associated with each device adapted to register the angular adjustment of said device with respect to the axis of said support.

3. In a connecting rod testing and aligning machine, a frame, a main support mounted upon the frame upon which the bearing at one end of the connecting rod is adapted to be removably pivotally mounted, the bearing at the opposite end of the rod being provided with a pin carried thereby, a plurality of indicating devices mounted upon the frame, each device being angularly adjustable with respect to the axis of said support, and an indicating member associated with each device to register the angular adjustment of the device with respect to the axis of the support.

4. In a machine for testing and aligning a connecting rod having a bearing at each end and a pin mounted in one bearing, a frame, an arbor carried by the frame, a plurality of indicating devices mounted upon the frame, each device being angularly adjustable with respect to the other and with respect to the axis of the arbor, and an indicator coupled with each device adapted to register the angular adjustment of the device with respect to the axis of the arbor.

5. In a machine for testing and aligning a connecting rod having a bearing at each end and a pin mounted in one bearing thereof, a frame, an arbor carried by the frame upon which the bearing at one end of the connecting rod is adapted to be mounted to pivotally support the rod thereon, an indicating device pivotally supported upon the frame for swinging movement in a horizontal plane and having a vertical face adapted to contact said pin, a second indicating device pivotally supported upon the frame for swinging movement in a vertical plane and having a horizontal face adapted to contact said pin, and an indicator for each device adapted to register the swinging movement thereof.

6. A connecting rod testing and aligning machine having a main support upon which the bearing at one end of the connecting rod is adapted to be mounted to pivot the rod thereabout, the bearing at the opposite end of said rod being provided with a pin mounted therein, in combination with an indicating device angularly adjustable with respect to the axis of said main support and having spaced apart faces adapted to contact said pin at opposite ends of its bearing, and a second indicating device angularly adjustable with respect to the axis of said main support having spaced apart faces adapted to contact said pin at opposite ends of its bearing, said devices being movably supported for adjustment toward or away from said main support and provided with means for indicating their angular adjustment with respect to the axis of said main support.

7. A connecting rod testing and aligning machine having an arbor adapted to receive the bearing at one end of the rod to support the rod to pivot thereabout in combination with, a head and means on the machine supporting the head for movable adjustment toward and away from said arbor, and a plurality of indicating devices mounted thereon and angularly adjustable with respect to the axis of the arbor, to be brought into contact with the free end of the rod.

8. In a machine for testing and aligning a connecting rod having a crank shaft bearing at one end and a piston pin at the opposite end, a frame, an arbor thereon extending horizontally and adapted to receive the crank shaft bearing of the rod to support the rod, a standard on the frame perpendicular to the horizontal plane of the arbor, a head supported upon said standard to be adjustably positioned toward or away from the arbor, a plurality of indicating devices carried by the head, each indicating device being adjustable with respect to the axis of the arbor and having a contact surface adapted to be brought into engagement with a portion of the surface of the pin carried by the rod, said indicating devices being so supported that said respective contact surfaces engage relatively angularly arranged portions of said pin, and each of said devices provided with means operable to automatically indicate the angular adjustment of the device with respect to the axis of the arbor necessary to bring the contact surface of said device into engagement with the corresponding surface of the pin.

9. In a machine for testing and aligning a connecting rod having a crank shaft bearing at one end and a piston pin carried in a bearing at the opposite end, the combination with an arbor extending horizontally and adapted to receive the crank shaft bearing of the rod to support the rod, of a standard perpendicular to the horizontal plane of the arbor, a head supported upon said standard to be adjustably positioned toward and away from said arbor, and a plurality of indicating devices carried by said head, each indicating device adjustable with respect to the axis of the arbor and having a surface adapted to contact a portion of the surface of the pin carried by the rod mounted upon the arbor, said devices so supported that said respective surfaces engage relatively angularly arranged portions of said pin and each device provided with means for automatically indicating the angular adjustment of the device with respect to the axis of the arbor.

10. A machine for testing and aligning a connecting rod having a crank shaft bearing at one end and a piston pin carried in a bearing at the opposite end, including an arbor extending horizontally and adapted to receive the crank shaft bearing of the rod to support the rod, in combination with a pair of spaced upright guides perpendicular to the axis of the horizontal plane of the arbor, and a head slidably supported upon said guides for adjustment toward or away from said arbor, and a pair of indicating devices carried by said head individually angularly adjustable with respect to the axis of the arbor and with respect to each other to be brought into contact with relatively angularly arranged portions of the pin carried by the connecting rod, each device being provided with a part adapted to register the angular adjustment of said device with respect to the axis of the arbor.

11. A connecting rod testing and aligning machine having an arbor adapted to receive the bearing at one end of the rod to support the rod to pivot thereabout in combination with a head and means on the machine supporting the head for guided movement toward and away from said arbor, and a plurality of relatively angularly disposed indicating devices individually mounted upon said head for angular adjustment with respect to the axis of the arbor, each device adapted to contact the pin carried by the bearing at the free end of the rod and each provided with means for registering its angular adjustment, with respect to the axis of the arbor.

12. In a connecting rod testing and aligning machine, the combination with an arbor adapted to removably receive the bearing at the crankshaft end of the rod, the bearing at the opposite end thereof being provided with a pin extending therethrough, of a head and means supporting the head for guided adjustable movement toward and away from said arbor, and an indicating device pivotally supported upon said head for angular movement in a vertical plane and having faces adapted to engage the pin at opposite ends of its bearing, and a second indicating device pivotally supported upon said head for angular movement in a horizontal plane and having faces adapted to engage the pin at opposite ends of its bearing and at an angle to the plane of engagement thereof by said first-mentioned device, each device provided with an indicator adapted to register the displacement thereof from a plane parallel to an axial plane of the arbor.

13. In a connecting rod testing and aligning machine, the combination with an arbor adapted to removably receive the bearing at the crankshaft end of the rod, the bearing at the opposite end thereof being provided with a pin extending therethrough, of a head and means supporting the head for guided adjustable movement toward and away from said arbor, and an indicating device supported upon said head for angular movement with respect to the axis of the arbor, said device provided with face portions adapted to engage the pin at opposite ends of its bearing, and a second indicating device pivotally supported upon the first device for angular movement with respect to the axis of the arbor, said device provided with face portions adapted to engage the pin at opposite ends of its bearing and angularly with respect to the plane of engagement thereof by said first-mentioned device, and a pointer carried by each device adapted to register the angular adjustment thereof with respect to the axis of the arbor necessary to bring said device into engagement with the pin at both ends of its bearing.

14. In a connecting rod testing and aligning machine, a base, an arbor thereon adapted to receive the bearing at one end of the connecting rod to support the rod to pivot thereabout, the opposite end of said rod being provided with a pin extending through the bearing at such end, guides upon the base, a head mounted upon the guides for adjustment toward or away from the arbor, and a plurality of indicating devices carried by the head, each device having a portion adapted to engage said pin at opposite ends of its bearing when the axis of the pin is parallel to the axis of the arbor, each device being individually angularly adjustable with respect to the axis of the arbor to so engage the pin when not parallel to the arbor and each device provided with means adapted to register the angular adjustment of said device with respect to the axis of the arbor.

15. In a machine for testing and aligning a connecting rod having a crankshaft bearing at one end and a piston pin bearing at the opposite end, a base provided with an arbor adapted to removably receive the crankshaft bearing, and a head mounted on the base and movable toward and away from the arbor transversely the axis thereof to adjusted positions with respect thereto, a pair of indicating devices mounted upon said head and individually angularly adjustable with respect to the axis of the arbor, each device adapted to contact the piston pin end of the rod to register the alignment thereof with respect to the axis of the arbor.

16. A machine for testing and aligning a connecting rod having a main bearing at one end and a piston pin bearing at the opposite end provided with a piston pin, said machine including: an arbor extending horizontally and adapted to receive the main bearing of the rod to pivotally support the rod thereon, a guide perpendicular to the axis of the horizontal plane of the arbor, a head slidably mounted upon the guide for adjustment toward and away from said arbor, a pair of indicating devices individually pivotally mounted upon said head, each of said devices provided with spaced apart contact faces adapted to engage the pin carried by the rod on opposite sides of its support in the rod, and each device provided with an indicator carried by the head adapted to automatically register the angular adjustment of the device with respect to the axis of the arbor.

17. A machine for testing and aligning a connecting rod having a main bearing at one end and a piston pin bearing at the opposite end provided with a piston pin, said machine including: a base, a pair of spaced apart upright guides on the base, a shaft mounted on the base transversely of said guides, said shaft adapted to receive the main bearing of a connecting rod to support the rod opposite the interval between the guides, a head slidably mounted between the guides for movement toward or away from said shaft, an indicating device pivotally supported upon the head for angular adjustment with respect to the axis of the arbor, said indicating device adapted to engage the top of the piston pin carried by the rod, and a registering member on the head associated with said indicating device to be automatically actuated thereby to register the angular deviation thereof with respect to the axis of said arbor.

18. A machine for testing and aligning a connecting rod having a main bearing at one end and a piston pin bearing at the opposite end provided with a piston pin, said machine including: a base, a pair of spaced apart upright guides on the base, a shaft mounted on the base transversely of said guides, said shaft adapted to receive the main bearing of a connecting rod to support the rod opposite the interval between the guides, a head slidably mounted between the guides for movement toward or away from said shaft, an indicating device pivotally supported upon the head for angular adjustment with respect to the axis of the arbor, said indicating device adapted to engage the top of the piston pin carried by the rod, a second indicating device pivotally supported upon the head for angular adjustment with respect to the axis of the arbor, said indicating device adapted to engage the piston pin at a point substantially 90° distant from the point thereof engaged by the first mentioned indicating device and a pair of registering members one coupled with each indicating device to be actuated thereby to automatically register the deflection thereof with respect to the axis of said arbor.

In testimony whereof, I sign this specification.

GEORGE E. HOLTON.